F. H. WHITMAN.
DRAG LINK DEVICE.
APPLICATION FILED AUG. 11, 1914.
1,135,237. Patented Apr. 13, 1915.
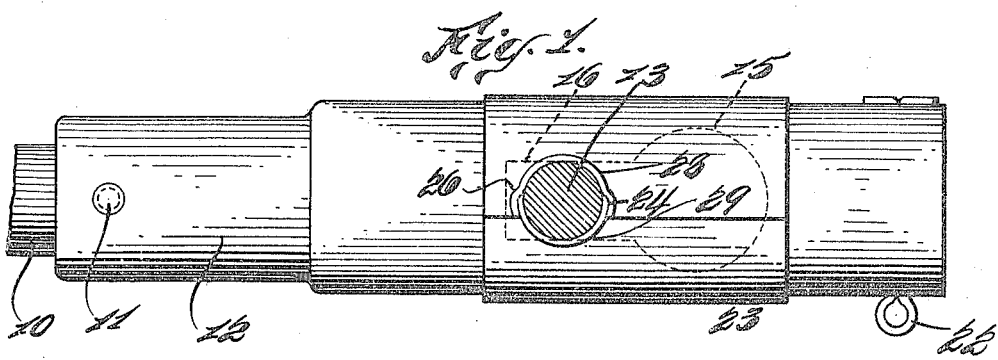
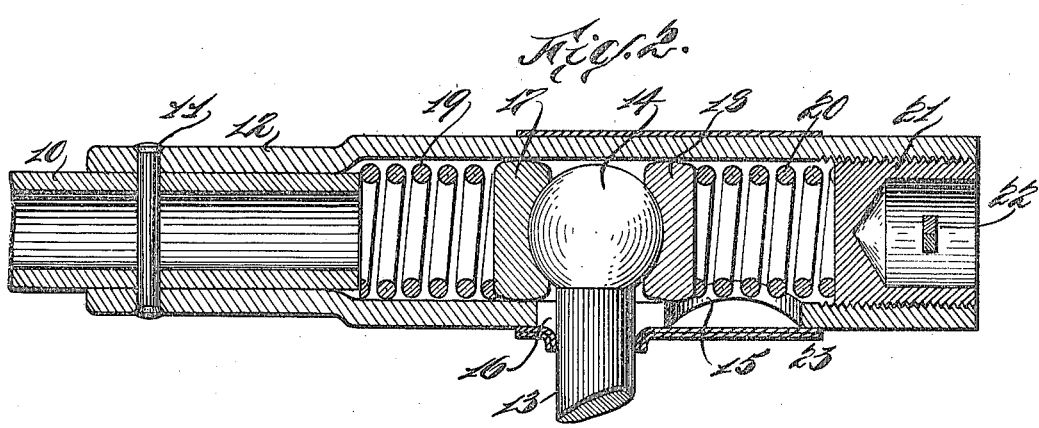
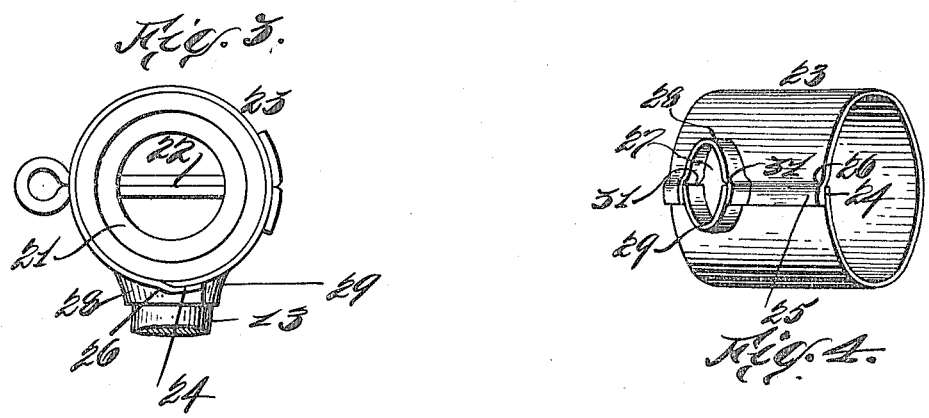
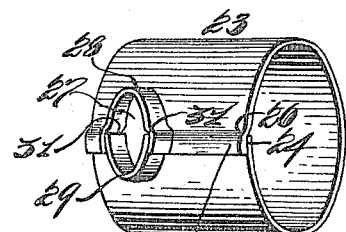
Witnesses
Inventor
Fred. H. Whitman
by Newell & Neal
attorneys

UNITED STATES PATENT OFFICE.

FREDERICK H. WHITMAN, OF DETROIT, MICHIGAN, ASSIGNOR TO DODGE BROTHERS, OF DETROIT, MICHIGAN, A CORPORATION OF MICHIGAN.

DRAG-LINK DEVICE.

1,135,237.  Specification of Letters Patent.  Patented Apr. 13, 1915.

Application filed August 11, 1914. Serial No. 856,225.

*To all whom it may concern:*

Be it known that I, FREDERICK H. WHITMAN, a citizen of the United States, residing at Detroit, Michigan, have invented certain new and useful Improvements in Drag-Link Devices, of which the following is a clear, full, and exact description.

This invention relates to an improved drag link device, composed of spring metal, more particularly adapted for constituting a self-acting dust guard for the universal joint between the drag link and steering gear arm, or between the drag link and the steering knuckle arm of the steering gear of a motor-driven car.

A further object of the invention is to provide a metallic guard which is adapted to give a practically oil-proof construction, that is to say, it is adapted to practically contain the lubricant for the joint.

Other objects are to provide a simple and efficient device for covering a universal joint such as referred to.

These being among the objects of the present invention, the same consists in suitable features of construction and combinations of parts to be hereinafter described and then claimed with reference to the accompanying drawings illustrating a suitable embodiment of the invention and in which—

Figure 1 illustrates a drag link and its universal joint to which the present improvement is applied; Fig. 2 is a longitudinal section thereof, parts being in elevation; Fig. 3 is an end view; and Fig. 4 is a perspective view of the improved device.

Referring to the drawings, a fragment of tube 10 forming the main part of the drag link is shown, to which may be welded or screwed, or as shown may be connected, as by means of a rivet 11, an outer tube section 12. The steering gear arm or the steering knuckle arm 13 is provided with a ball or spherical head 14 which is inserted within the tube 12 through an opening 15 therein. Extending laterally from said opening 15 is a slot 16 through which the shank of the arm 13 extends, it being pushed into that position and held there resiliently through the medium of follower blocks 17, 18 within the tube 12, which are pushed against the head 14 by means of helical springs 19, 20. The internal parts of the tube 12 are held therein by means of a screw cap or by a screw plug 21 having a threaded engagement with the outer end of the tube 12 and held against turning by means of a cotter pin 22 passing through the plug and said tube. The described construction is of the usual type, although it may be of any other suitable construction as for instance the British construction in which in place of the housing formed by the tube 12 an open or link-like frame is used.

The improvement in the present invention resides in substituting for the usual leather boot around the joint a clasp or bracelet 23 of spring sheet metal, preferably steel. This spring metal device is preferably formed in closed circular form, as shown more clearly in Fig. 3 so as to be self-acting. Said clasp 23 is provided with lapping edge portions 24, 25, the edge portion 25 being preferably set out of the plane of the other edge portion 24, by bending the edge portion 25 outwardly to form a shoulder at 26, so that the inner surface of the edge portion 25 will contact with the outer surface of the edge portion 24. The clasp is provided with an opening 27, surrounding which are walls 28, 29 which are formed by turning portions of the sheet metal plate outwardly. The said opening is preferably formed by making recesses in the adjacent edge portions of the clasp, and the ends of the wall 28 are preferably turned out or set beyond the wall 29 so as to provide offsets or shoulders 31. Thereby a complete inclosing wall is provided. The said clasp or bracelet is sprung over the joint to be protected against dust and to hold lubricant in the joint. It will be seen that the fit upon the housing 12 is a snug one and that the opening 15 is closed thereby, while the shank of the arm 13 extends through the opening 27 and the turned-out walls or flanges 28, 29 are in substantial contact with the shank of the arm and prevent wear of said shank. It is also apparent that the metallic clasp constitutes a cover by which the movements of the steering arm and link relatively to each other are taken care of by the shifting of said cover bodily upon said link. Another feature resides in dividing the cover in line with the opening for the steering arm.

Obviously the invention is susceptible of modifications, as parts may be omitted, parts added and parts substituted without departing from the scope thereof as expressed in the claims.

What I claim as new is:—

1. A dust guard, comprising a flexible clasp of spring sheet metal provided with overlapping edges, one of said edges being permanently set out of the plane of the other edge.

2. A dust guard, comprising a flexible clasp of spring sheet metal of which its edge portions are recessed to provide an opening with a surrounding wall.

3. A dust guard, comprising a flexible clasp of spring sheet metal provided with edge portions which are recessed to provide an opening with a surrounding wall, and the said wall being turned out from the clasp to provide permanently set flanges.

4. In a drag link device, the combination with a housing, and an arm extending thereinto and jointed therewith, of a flexible self-acting clasp of spring sheet metal applied around said housing and having overlapping edges, and being free from any means for fastening it onto said housing, other than itself.

5. In a drag link device, the combination with a housing, and an arm extending thereinto and jointed therewith, of a flexible self-acting clasp of spring sheet metal applied around said housing and having an opening at its edges through which said arm passes.

6. In a drag link device, the combination with a housing, and an arm extending thereinto and jointed therewith, of a flexible clasp of spring sheet metal applied around said housing and having overlapping edges, one of said edges being permanently set out of the plane of the other edge.

7. In a drag link device, the combination with a housing, and an arm extending thereinto and jointed therewith, of a flexible clasp of spring sheet metal applied around said housing and having overlapping edges, the edge portions of which clasp are recessed to provide an opening with a close fitting wall, and through which said arm extends.

8. In a drag link device, the combination with a housing, and an arm extending thereinto and jointed therewith, of a flexible clasp of spring sheet metal applied around said housing and having overlapping edges, the edge portions of which clasp are recessed to provide an opening with a close fitting wall, and through which said arm extends, and the said wall being turned out from the clasp to provide permanently set flanges.

9. In a drag link device, the combination with a housing, and an arm extending thereinto and jointed therewith, of a flexible cylindrical self-acting clasp of spring steel applied around said housing and having overlapping edges, one of said edges being permanently set out of the plane of the other edge, both of the edge portions of said clasp being recessed to provide an opening with walls turned out to provide permanently set flanges, said arm passing through said opening in contact with said flanges.

10. In a drag link device, the combination with a housing provided with an opening, and an arm extending into said opening and jointed with said housing, of a metallic cover having an opening and split in line with said opening, said cover having a snug but movable fit on said housing, whereby it is adapted to have a bodily movement relatively to said housing.

11. In a drag-link device, the combination of a housing, a cover of spring metal having a side opening, said cover being split laterally from said opening and sprung onto said housing, and an arm extending through said opening into said housing, and jointed with the latter, said spring metal cover acting to grip said housing so as to snugly fit it and yet be shiftable as a whole by means of said arm.

12. In a drag-link device, the combination with a housing, and an arm extending thereinto and jointed therewith, of a flexible self-acting clasp applied around said housing and having an opening at its edges, through which said arm passes.

Signed at Detroit this 29th day of July 1914.

FREDERICK H. WHITMAN.

Witnesses:
W. R. WILSON,
G. W. MASON.